US010957883B2

(12) United States Patent
Muroya et al.

(10) Patent No.: US 10,957,883 B2
(45) Date of Patent: *Mar. 23, 2021

(54) PRISMATIC SECONDARY BATTERY, AND ASSEMBLED BATTERY AND VEHICLE INCLUDING THE SAME

(71) Applicant: SANYO ELECTRIC CO., LTD., Daito (JP)

(72) Inventors: Yohei Muroya, Hyogo (JP); Kazuki Takeno, Hyogo (JP); Mitsuhiro Okada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 143 days.

This patent is subject to a terminal disclaimer.

(21) Appl. No.: 15/991,101

(22) Filed: May 29, 2018

(65) Prior Publication Data

US 2018/0351140 A1 Dec. 6, 2018

(30) Foreign Application Priority Data

May 31, 2017 (JP) ................................. 2017-107481

(51) Int. Cl.
*H01M 2/02* (2006.01)
*H01M 2/08* (2006.01)
(Continued)

(52) U.S. Cl.
CPC ....... *H01M 2/0217* (2013.01); *H01M 2/0473* (2013.01); *H01M 2/06* (2013.01); *H01M 2/08* (2013.01); *H01M 2/1241* (2013.01); *H01M 4/382* (2013.01); *H01M 4/661* (2013.01); *H01M 10/05* (2013.01); *H01M 2/206* (2013.01);
(Continued)

(58) Field of Classification Search
None
See application file for complete search history.

(56) References Cited

U.S. PATENT DOCUMENTS

2010/0279156 A1 11/2010 Kim et al.
2011/0305929 A1* 12/2011 Byun .................... H01M 2/345
429/61

(Continued)

FOREIGN PATENT DOCUMENTS

JP 7-99045 A 4/1995
JP 2009-295418 A 12/2009
(Continued)

*Primary Examiner* — Rena Dye Cronin
(74) *Attorney, Agent, or Firm* — Westerman, Hattori, Daniels & Adrian, LLP

(57) ABSTRACT

A prismatic secondary battery includes an electrode body including a positive-electrode sheet and a negative-electrode sheet, a prismatic exterior body that accommodates the electrode body, a sealing plate that seals an opening of the prismatic exterior body, and a negative terminal electrically connected to the negative-electrode sheet. The positive-electrode sheet is electrically connected to the sealing plate. The sealing plate has a recessed portion on an outer surface and a terminal insertion hole formed in the recessed portion. The negative terminal is inserted in the terminal insertion hole. An outer insulating member is disposed between the negative terminal and the sealing plate. The sealing plate has a first groove extending to an end of the recessed portion in the longitudinal direction of the sealing plate.

9 Claims, 6 Drawing Sheets

(51) Int. Cl.
| | |
|---|---|
| *H01M 4/66* | (2006.01) |
| *H01M 2/06* | (2006.01) |
| *H01M 2/04* | (2006.01) |
| *H01M 10/05* | (2010.01) |
| *H01M 4/38* | (2006.01) |
| *H01M 2/12* | (2006.01) |
| *H01M 4/505* | (2010.01) |
| *H01M 4/525* | (2010.01) |
| *H01M 4/133* | (2010.01) |
| *H01M 4/02* | (2006.01) |
| *H01M 2/20* | (2006.01) |
| *H01M 10/0525* | (2010.01) |

(52) U.S. Cl.
CPC ............ *H01M 4/133* (2013.01); *H01M 4/505* (2013.01); *H01M 4/525* (2013.01); *H01M 10/0525* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2014/0023889 A1* | 1/2014 | Hattori | H01M 2/024 429/53 |
| 2017/0149046 A1* | 5/2017 | Urano | H01M 2/1241 |
| 2017/0352846 A1* | 12/2017 | Li | H01M 2/043 |

FOREIGN PATENT DOCUMENTS

| | | |
|---|---|---|
| JP | 2011-18645 A | 1/2011 |
| JP | 2015-35304 A | 2/2015 |

* cited by examiner

PRISMATIC SECONDARY BATTERY, AND ASSEMBLED BATTERY AND VEHICLE INCLUDING THE SAME

CROSS REFERENCE TO RELATED APPLICATIONS

The present invention application claims priority to Japanese Patent Application No. 2017-107481 filed in the Japan Patent Office on May 31, 2017, the entire contents of which are incorporated herein by reference.

BACKGROUND OF THE INVENTION

Field of the Invention

The present invention relates to a prismatic secondary battery, and an assembled battery and a vehicle that include the prismatic secondary batteries.

Description of Related Art

Prismatic secondary batteries such as non-aqueous electrolyte secondary batteries are used in power sources for driving, for example, electric vehicles (EVs) and hybrid electric vehicles (HEVs or PHEVs).

Each of the prismatic secondary batteries includes a battery case formed of a prismatic exterior body in the form of a tube having an opening and a bottom, and a sealing plate that seals the opening of the prismatic exterior body. In the battery case, an electrode body and an electrolyte are accommodated, and the electrode body is formed of a positive-electrode sheet, a negative-electrode sheet, and a separator. A positive terminal and a negative terminal are secured to the sealing plate with insulating members interposed therebetween. The positive terminal is electrically connected to the positive-electrode sheet with a positive-electrode current collector interposed therebetween. The negative terminal is electrically connected to the negative-electrode sheet with a negative-electrode current collector interposed therebetween.

In a proposed prismatic secondary battery as disposed in Japanese Published Unexamined Patent Application No. 2011-18645 (Patent Document 1), the positive-electrode current collector is connected to a surface of the sealing plate on the inner side of the battery, and the battery case doubles as the positive terminal.

This structure has an advantage such as a decrease in the number of components.

BRIEF SUMMARY OF THE INVENTION

The prismatic secondary battery, the battery case of which is electrically connected to one of the electrode sheets needs to prevent a short circuit due to, for example, water caused by condensation from occurring between the sealing plate electrically connected to the one of the electrode sheets and the terminal electrically connected to the other electrode sheet.

An object of the present invention is to provide a prismatic secondary battery that prevents a short circuit from occurring between the battery case and the terminal, and an assembled battery and a vehicle that include the prismatic secondary batteries.

A prismatic secondary battery according to an aspect of the present invention includes an electrode body including a first electrode sheet and a second electrode sheet having a polarity opposite to a polarity of the first electrode sheet, a prismatic exterior body that has an opening and that accommodates the electrode body, a sealing plate that seals the opening, and a terminal electrically connected to the first electrode sheet. The second electrode sheet is electrically connected to the sealing plate. The sealing plate has a recessed portion formed on an outer surface and a terminal insertion hole formed in the recessed portion. The terminal is inserted in the terminal insertion hole. An outer insulating member is disposed between the terminal and the sealing plate. The sealing plate has a groove extending to an end of the recessed portion in a longitudinal direction of the sealing plate.

Under development, the inventors have found that water caused by condensation, for example, is stored in the recessed portion formed on the outer surface of the sealing plate, and that there is a risk that a short circuit due to the water occurs between the sealing plate and the terminal. With the structure of the prismatic secondary battery according to the aspect of the present invention, even when water caused by condensation, for example, enters the recessed portion, the water in the recessed portion flows into the groove. Accordingly, a water level in the recessed portion can be inhibited from increasing, and a short circuit due to water can be prevented from occurring between the sealing plate and the terminal.

The present invention is particularly effective when the prismatic secondary battery is arranged such that the sealing plate extends in the vertical direction during the use of the prismatic secondary battery.

The inventors have found the following: when the prismatic secondary battery including the sealing plate to which one of the electrode sheets is electrically connected is arranged such that the sealing plate extends in the vertical direction during the use of the prismatic secondary battery, a short circuit due to water caused by condensation is likely to occur between the sealing plate and the terminal. The reason will now be described with reference to FIG. 10A and FIG. 10B.

FIG. 10A is an enlarged view of a part of a prismatic secondary battery near a negative terminal 108 of the prismatic secondary battery arranged such that a sealing plate 102 extends in the vertical direction. As illustrated in FIG. 10A, the negative terminal 108 is secured to the sealing plate 102 with an outer insulating member 110 interposed therebetween. A recessed portion 120 is formed on the sealing plate 102. The outer insulating member 110 is disposed inside the recessed portion 120. A space 121a and a space 121b are formed between side walls of the recessed portion 120 formed on the sealing plate 102 and the outer insulating member 110. The vertical direction in FIG. 10A corresponds to the vertical direction of the prismatic secondary battery when the prismatic secondary battery is used.

In some cases, the prismatic secondary battery is arranged such that the sealing plate 102 to which the negative terminal 108 is secured extends in the vertical direction during the use of the prismatic secondary battery. For example, an assembled battery is manufactured in a manner in which prismatic secondary batteries are connected to each other in series or in parallel. In some cases, an electric vehicle or a hybrid vehicle is equipped with the assembled battery such that the sealing plates 102 of the prismatic secondary batteries, to which the corresponding negative terminals 108 are secured, are arranged along a side surface of the assembled battery.

When each prismatic secondary battery is used in this state, drops of water are produced on a surface of the sealing plate 102 and a surface of the negative terminal 108 because of, for example, condensation in some cases. FIG. 10B illustrates a state where drops of water are produced on a surface of the sealing plate 102 and a surface of the negative terminal 108. When the drops of water are produced on the surface of the sealing plate 102 and the surface of the negative terminal 108, the drops of water flow downward due to the gravity because the sealing plate 102 extends in the vertical direction. The drop of water produced on the surface of the sealing plate 102 is stored in the space 121a and the space 121b between the recessed portion 120 formed around a hole of the sealing plate 102 for securing the negative terminal 108 and the outer insulating member 110. The water stored in the space 121b on the upper side flows into the space 121a on the lower side. A large amount of the water is stored in the space 121a on the lower side. At the same time, the drop of water produced on the surface of the negative terminal 108 also flows downward due to the gravity. A drop of water 130a that has flowed to the lower end of the negative terminal 108 comes into contact with a drop of water 130b stored in the space 121a on the lower side. Consequently, these drops of water cause a short circuit between the sealing plate 102 and the negative terminal 108. Such a problem is particularly likely to arise in the case of a prismatic secondary battery for use in a vehicle in an environment under which the temperature greatly varies.

With the structure of the prismatic secondary battery according to the aspect of the present invention, the sealing plate has the groove extending to the recessed portion. Accordingly, water that enters the recessed portion flows into the groove, and a water level in the recessed portion can be inhibited from increasing. Consequently, a short circuit due to, for example, water caused by condensation can be effectively prevented from occurring between the sealing plate 102 and the negative terminal 108. This effect is particularly marked in a prismatic secondary battery that is arranged such that the sealing plate extends in the vertical direction during the use of the prismatic secondary battery.

With the structure of the prismatic secondary battery according to the aspect of the present invention, also when the prismatic secondary battery is arranged such that the sealing plate does not extend in the vertical direction during the use of the prismatic secondary battery, a short circuit due to, for example, water caused by condensation can be prevented from occurring between the sealing plate and the terminal with certainty.

An assembled battery can include the prismatic secondary batteries according to the aspect of the present invention. A vehicle can be equipped with the assembled battery.

The prismatic secondary battery provided according to the aspect of the present invention prevents a short circuit due to, for example, water caused by condensation from occurring between the sealing plate and the terminal. The assembled battery and the vehicle provided according to the aspect of the present invention include the prismatic secondary batteries.

DETAILED DESCRIPTION OF THE INVENTION

The structure of a prismatic secondary battery 50 according to an embodiment will hereinafter be described. The present invention is not limited to the embodiment described below.

Figure 1:
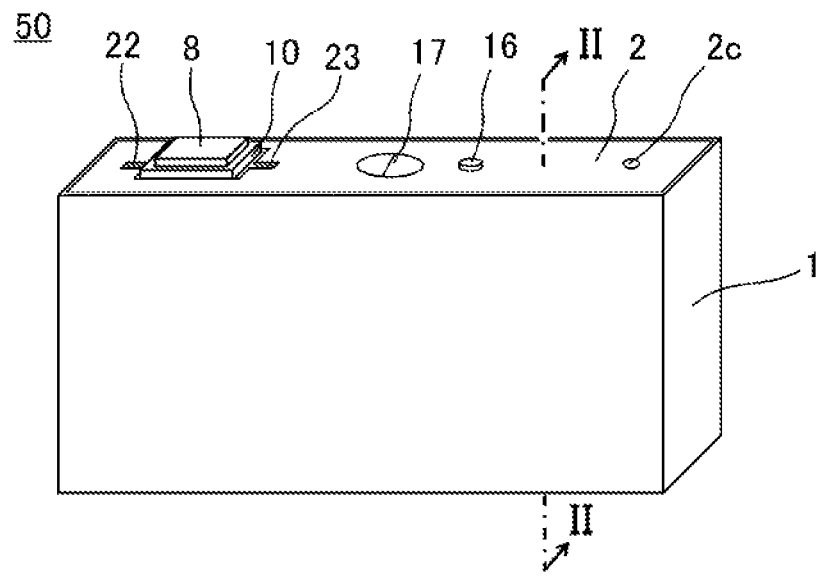
FIG. 1 is a perspective view of a prismatic secondary battery according to an embodiment.
Figure 2:
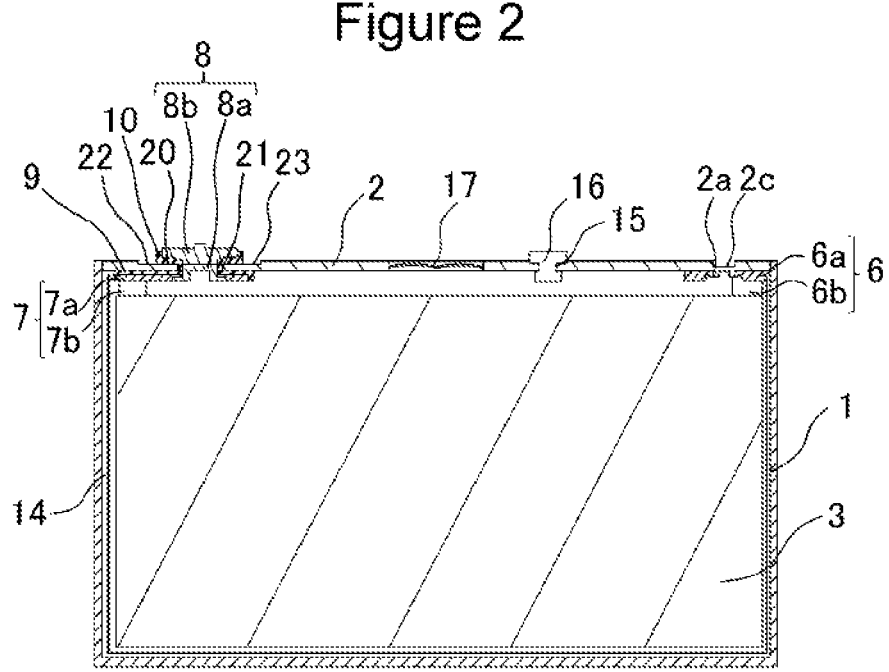
FIG. 2 is a sectional view of the prismatic secondary battery taken along line II-II in FIG. 1.

FIG. 1 is a perspective view of the prismatic secondary battery 50. FIG. 2 is a sectional view of the prismatic secondary battery 50 taken along line II-II in FIG. 1. As illustrated in FIG. 1 and FIG. 2, the prismatic secondary battery 50 includes a battery case formed of a prismatic exterior body 1 in the form of a tube having an opening and a bottom and a sealing plate 2 that seals the opening of the prismatic exterior body 1. The prismatic exterior body 1 and the sealing plate 2 are preferably formed of a metal and are preferably formed of, for example, aluminum or an aluminum alloy. In the prismatic exterior body 1, an electrode body 3 and an electrolyte are accommodated, and the electrode body 3 is formed of a positive-electrode sheet and a negative-electrode sheet that are stacked or wound with a separator interposed therebetween. A resin insulation sheet 14 is disposed between the electrode body 3 and the prismatic exterior body 1.

A positive-electrode current collector 6 is connected to the positive-electrode sheet included in the electrode body 3. The positive-electrode current collector 6 is connected to a surface of the sealing plate 2 on the inner side of the battery. Thus, the positive-electrode sheet is electrically connected to the sealing plate 2 with the positive-electrode current collector 6 interposed therebetween. The positive-electrode current collector 6 is preferably formed of a metal and is preferably formed of aluminum or an aluminum alloy.

A negative-electrode current collector 7 is connected to the negative-electrode sheet included in the electrode body 3. The negative-electrode current collector 7 is electrically connected to a negative terminal 8. An inner insulating member 9 is disposed between the negative-electrode current collector 7 and the sealing plate 2. An outer insulating member 10 is disposed between the negative terminal 8 and the sealing plate 2. Thus, the negative-electrode current collector 7 and the negative terminal 8 are insulated from the sealing plate 2. The negative-electrode current collector 7 is preferably formed of a metal and is preferably formed of copper or a copper alloy. The inner insulating member 9 and the outer insulating member 10 are preferably formed of a resin. The negative terminal 8 is preferably formed of a metal and is preferably formed of copper or a copper alloy. As illustrated in FIG. 2, the negative terminal 8 is preferably formed of a first metal portion 8a disposed on the inner side of the battery and a second metal portion 8b disposed on the outer side of the battery. In this case, the first metal portion 8a is preferably formed of copper or a copper alloy. The second metal portion 8b is preferably formed of aluminum or an aluminum alloy. When an assembled battery is manufactured by using prismatic secondary batteries each having this structure, a bus-bar formed of aluminum or an aluminum alloy is preferably used to connect the positive terminal of one of the prismatic secondary batteries and the negative terminal of another prismatic secondary battery. A nickel layer is preferably formed on a surface of the first metal portion 8a.

A recessed portion 20 is formed on a surface of the sealing plate 2 on the outer side of the battery. A terminal insertion hole 21 is formed in the recessed portion 20. The negative terminal 8 is inserted in the terminal insertion hole 21.

A gas exhausting valve 17 is formed in the sealing plate 2. The gas exhausting valve 17 is broken when the pressure in the battery case becomes a certain pressure or more, and gas in the battery case is discharged therefrom to the outside of the battery case. The sealing plate 2 has an electrolytic solution injection hole 15. After an electrolytic solution is injected into the battery case, the electrolytic solution injection hole 15 is sealed by a sealing plug 16.

A method of manufacturing the prismatic secondary battery 50 will now be described. In the prismatic secondary battery 50 according to the embodiment, the negative-electrode sheet is a first electrode sheet, and the positive-electrode sheet is a second electrode sheet.

Manufacture of Positive-Electrode Sheet

A positive-electrode mixture slurry containing a lithium-nickel-cobalt-manganese composite oxide as a positive electrode active material, a polyvinylidene fluoride (PVdF) as a binder, a carbon material as a conductive material, and N-methyl-2-pyrrolidone (NMP) is prepared. The positive-electrode mixture slurry is applied to both surfaces of an elongated aluminum foil having a thickness of 15 μm that is used as a positive-electrode core. The NMP in the positive-electrode mixture slurry is removed by drying, and a positive electrode active material layer is formed on the positive-electrode core. Subsequently, the positive electrode active material layer is compressed to have a predetermined thickness and cut into a predetermined shape. The positive-electrode sheet thus obtained includes an exposed positive-electrode core portion 4 along an end portion of the elongated positive-electrode core in the width direction, and there are no positive electrode active material mixture layers on both surfaces thereof extending in the longitudinal direction of the positive-electrode core.

Manufacture of Negative-Electrode Sheet

A negative-electrode mixture slurry containing graphite as a negative electrode active material, styrene-butadiene rubber (SBR) as a binder, carboxymethyl cellulose (CMC) as a thickener, and water is prepared. The negative-electrode mixture slurry is applied to both surfaces of an elongated copper foil having a thickness of 8 μm that is used as a negative-electrode core. The water in the negative-electrode mixture slurry is removed by drying, and a negative electrode active material layer is formed on the negative-electrode core. Subsequently, the negative electrode active material layer is compressed to have a predetermined thickness and cut into a predetermined shape. The negative-electrode sheet thus obtained includes an exposed negative-electrode core portion 5 along an end portion of the elongated negative-electrode core in the width direction, and there are no negative electrode active material mixture layers on both surfaces thereof extending in the longitudinal direction of the negative-electrode core.

Manufacture of Electrode Body

Figure 3:
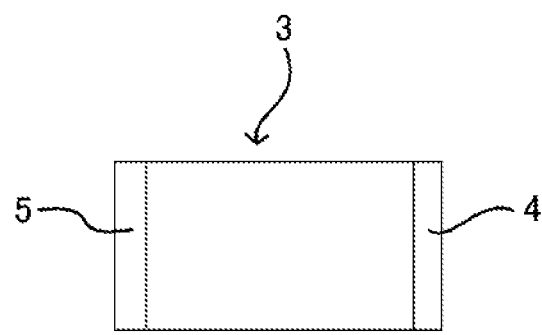
FIG. 3 is a front view of an electrode body according to the embodiment.

The electrode body 3 that is wound is manufactured in a manner in which the positive-electrode sheet and the negative-electrode sheet manufactured in the above manner are wound with the separator interposed therebetween. The electrode body 3 is formed into a flat shape. As illustrated in FIG. 3, the electrode body 3 includes the exposed positive-electrode core portion 4 that is wound along one of the end portions in the direction of a winding axis and the exposed negative-electrode core portion 5 that is wound along the other end portion. The outermost circumference of the electrode body 3 is preferably covered by the separator.

Figure 4:
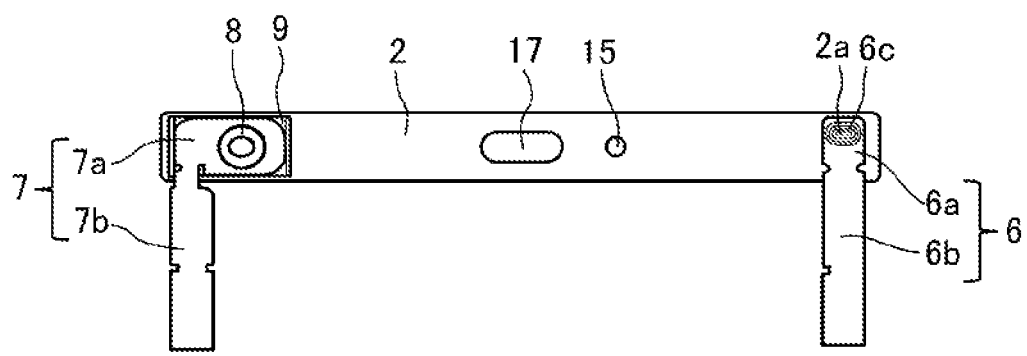
FIG. 4 illustrates a surface of a sealing plate on the inner side of the battery after components are secured.

Securing Negative-Electrode Current Collector and Negative Terminal to Sealing Plate The inner insulating member 9 is disposed on the sealing plate 2 on the inner surface side of the battery around the terminal insertion hole 21 formed in the sealing plate 2, and a base 7a of the negative-electrode current collector 7 is disposed thereon. The outer insulating member 10 is disposed on the sealing plate 2 on the outer surface side of the battery around the terminal insertion hole 21. Subsequently, the negative terminal 8 is inserted into a through-hole formed through the outer insulating member 10, the sealing plate 2, the inner insulating member 9, and the base 7a of the negative-electrode current collector 7. An end portion of the negative terminal 8 is crimped on the base 7a of the negative-electrode current collector 7. Thus, as illustrated in FIG. 2 and FIG. 4, the negative terminal 8, the outer insulating member 10, the inner insulating member 9, and the negative-electrode current collector 7 are secured to the sealing plate 2. A crimped portion of the negative terminal 8 and the base 7a of the negative-electrode current collector 7 are preferably welded to each other by, for example, laser welding to form a welded joint (not illustrated).

Securing Positive-Electrode Current Collector to Sealing Plate

Figure 5A:
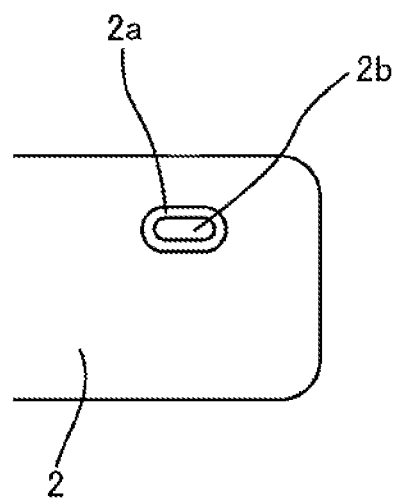
FIG. 5A is an enlarged view of a part of the sealing plate near a projection on the inner side of the battery.
Figure 5B:
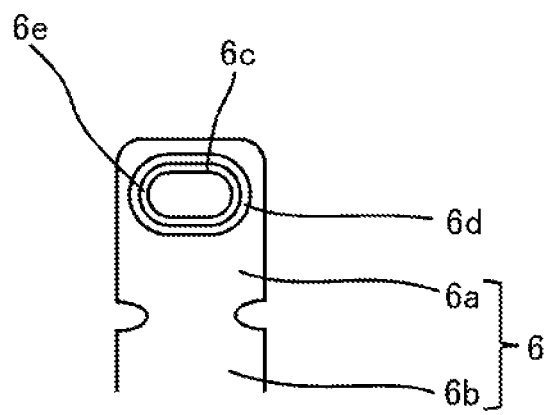
FIG. 5B is an enlarged view of a base of a positive-electrode current collector.

As illustrated in FIG. 5A, a projection 2a is formed on the surface of the sealing plate 2 on the inner side of the battery. The projection 2a is preferably located away from the center of the sealing plate 2 to one side (upward in FIG. 5A) in the transverse direction of the sealing plate 2. A recessed end portion 2b is preferably formed on an end of the projection 2a. The projection 2a is preferably oval in a plan view. An outer recessed portion 2c is formed on the surface of the sealing plate 2 on the outer side of the battery at a position corresponding to the projection 2a. As illustrated in FIG. 5B, a connection opening 6c is formed in a base 6a of the positive-electrode current collector 6. An annular thin portion 6d is preferably formed on the outer circumferential side of the connection opening 6c. An annular projection 6e is preferably formed around the edge of the connection opening 6c.

Figure 6:
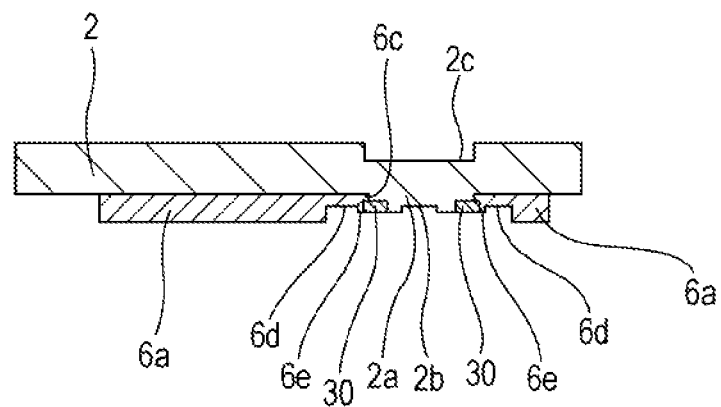
FIG. 6 is an enlarged sectional view of the sealing plate and the base of the positive-electrode current collector viewed in the transverse direction of the sealing plate.

As illustrated in FIG. 6, the base 6a of the positive-electrode current collector 6 is disposed on the surface of the sealing plate 2 on the inner side of the battery such that the projection 2a of the sealing plate 2 is located inside the connection opening 6c of the positive-electrode current collector 6. The projection 2a of the sealing plate 2 and the base 6a of the positive-electrode current collector 6 are welded to each other by, for example, laser welding. Thus, a welded joint 30 is formed. The welded joint 30 may be annular. A plurality of the welded joints 30 may be arranged at an interval.

Folding Positive-Electrode Current Collector and Negative-Electrode Current Collector The positive-electrode current collector 6 secured to the sealing plate 2 is folded along the boundary between the base 6a and a lead 6b. The negative-electrode current collector 7 secured to the sealing plate 2 is folded along the boundary between the base 7a and a lead 7b. The positive-electrode current collector 6 and the negative-electrode current collector 7 that are folded in advance can be secured to the sealing plate 2.

Connection Between Positive-Electrode Current Collector and Electrode Body and Between Negative-Electrode Current Collector and Electrode Body The lead 6b of the positive-electrode current collector 6 is welded to the outermost surface of the exposed positive-electrode core portion 4 of the electrode body 3 that is wound. The lead 7b of the negative-electrode current collector 7 is welded to the outermost surface of the exposed negative-electrode core portion 5 of the electrode body 3 that is wound. Examples of a connecting method can include resistance welding, ultrasonic welding, and laser welding.

Assembly of Prismatic Secondary Battery

The electrode body 3, which is secured to the sealing plate 2 with the positive-electrode current collector 6 and the negative-electrode current collector 7 interposed therebetween, is covered by the insulation sheet 14. Subsequently, the electrode body 3 covered by the insulation sheet 14 is inserted into the prismatic exterior body 1. The prismatic exterior body 1 and the sealing plate 2 are welded to each other by laser welding, and the opening of the prismatic exterior body 1 is sealed by the sealing plate 2. Subsequently, a non-aqueous electrolytic solution containing a non-aqueous solvent and an electrolyte salt is injected from the electrolytic solution injection hole 15 formed in the sealing plate 2. The electrolytic solution injection hole 15 is sealed by the sealing plug 16. A blind rivet is preferably used as the sealing plug 16. The sealing plug 16 that is formed of a metal can be welded to the sealing plate 2.

Prismatic Secondary Battery 50

Figure 7A:
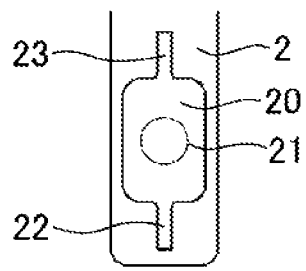
FIG. 7A is an enlarged view of a surface of the sealing plate on the outer side of the battery near a terminal insertion hole.

FIG. 7A is an enlarged view of the surface of the sealing plate 2 on the outer side of the battery near the terminal insertion hole 21. As illustrated in FIG. 7A, the terminal insertion hole 21 is formed in the recessed portion 20 of the sealing plate 2. A first groove 22 is formed from an end of the recessed portion 20 in the longitudinal direction of the sealing plate 2. A second groove 23 is formed from the other end of the recessed portion 20 in the longitudinal direction of the sealing plate 2. The first groove 22 is located nearer than the recessed portion 20 to an end portion of the sealing plate 2 in the longitudinal direction of the sealing plate 2. The second groove 23 is located nearer than the recessed portion 20 to the center of the sealing plate 2 in the longitudinal direction of the sealing plate 2. Both of the first groove 22 and the second groove 23 are not necessarily formed. It is only necessary for either or both of the first groove 22 and the second groove 23 to be formed. In the case where the first groove 22 or the second groove 23 is formed, the first groove 22 is preferably formed nearer than the recessed portion 20 to the end portion of the sealing plate 2 in the longitudinal direction of the sealing plate 2.

Figure 7B:
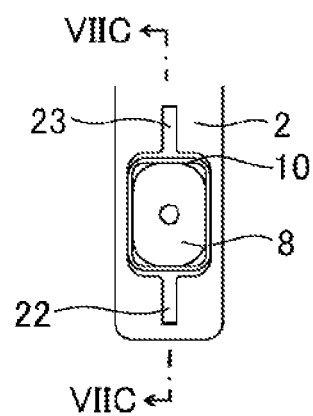
FIG. 7B illustrates an outer insulating member disposed on the sealing plate and a negative terminal disposed thereon.
Figure 7C:
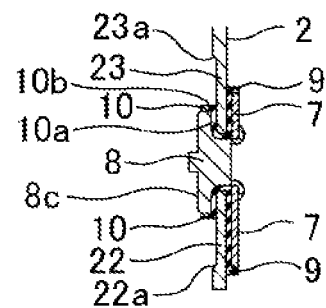
FIG. 7C is a sectional view of FIG. 7B taken along VIIC-VIIC.

FIG. 7B illustrates the outer insulating member 10 disposed on the recessed portion 20 and the negative terminal 8 disposed on the outer insulating member 10. FIG. 7C is a sectional view of FIG. 7B taken along VIIC-VIIC.

In the prismatic secondary battery 50, the first groove 22 and the second groove 23 are formed from the respective ends of the recessed portion 20. Accordingly, even when water caused by condensation, for example, enters a space between the recessed portion 20 and the outer insulating member 10, the water flows into the first groove 22 or the second groove 23, and a short circuit due to the water in the recessed portion 20 can be effectively prevented from occurring between the sealing plate 2 and the negative terminal 8.

The length of the first groove 22 and the length of the second groove 23 in the longitudinal direction of the sealing plate 2 range preferably from 1 mm to 20 mm, more preferably from 2 mm to 10 mm, further preferably from 3 mm to 10 mm. The distance between an end portion (lower end portion of the sealing plate 2 in FIG. 7A) of the sealing plate 2 in the longitudinal direction of the sealing plate 2 and an end portion (lower end portion of the first groove 22 in FIG. 7A) of the first groove 22 in the longitudinal direction of the sealing plate 2 is preferably 1.5 mm or more, more preferably 1.8 mm or more. When the distance between the end portion of the sealing plate 2 in the longitudinal direction of the sealing plate 2 and the end portion of the first groove 22 in the longitudinal direction of the sealing plate 2 is too short, there is a possibility that a weld between the sealing plate 2 and the prismatic exterior body 1 is not stable because heat escapes differently between a region near the first groove 22 and the other regions. When the distance between the end portion of the sealing plate 2 in the longitudinal direction of the sealing plate 2 and the end portion of the first groove 22 in the longitudinal direction of the sealing plate 2 is 1.5 mm or more, the weld between the sealing plate 2 and the prismatic exterior body 1 is more stable.

A space is preferably formed between the recessed portion 20 and the outer insulating member 10 in the longitudinal direction of the sealing plate 2. The length of the space in the longitudinal direction of the sealing plate 2 ranges preferably from 0.1 mm to 10 mm, more preferably from 0.1 mm to 5 mm, further preferably from 0.1 mm to 3 mm.

A space is formed between the recessed portion 20 and the outer insulating member 10 in the transverse direction of the sealing plate 2. The length of the space in the transverse direction of the sealing plate 2 ranges preferably from 0.1 mm to 5 mm, more preferably from 0.1 mm to 3 mm, further preferably from 0.1 mm to 1 mm. The space may not be formed.

The bottom of the recessed portion 20 and the bottom of the first groove 22 or the second groove 23 can be level with each other. The bottom of the recessed portion 20 and the bottom of the first groove 22 or the second groove 23 may not be level with each other.

An inclined portion 22a is preferably formed at the end of the first groove 22 opposite the recessed portion 20. Even when the prismatic secondary battery 50 is arranged such that the sealing plate 2 extends in the vertical direction during the use of the prismatic secondary battery, and water caused by condensation, for example, enters the recessed portion 20 and the first groove 22, the inclined portion 22a makes the water easy to flow from the inside of the first groove 22 to the outside of the first groove 22. The inclined portion 22a is preferably inclined at 30 degrees to 80 degrees with respect to the bottom of the first groove 22. The entire bottom of the first groove 22 may be inclined with respect to the bottom of the recessed portion 20.

An inclined portion 23a is preferably formed at the end of the second groove 23 opposite the recessed portion 20.

The portion of the sealing plate 2 at which the recessed portion 20 is formed is thinner than the other portion around the recessed portion 20.

The outer insulating member 10 preferably includes an insulating member base 10a disposed between the sealing plate 2 and a flange 8c of the negative terminal 8, and a wall 10b formed along the outer circumferential edge of the insulating member base 10a. The wall 10b faces the side surface of the flange 8c of the negative terminal 8. The wall 10b enables a short circuit to be prevented from occurring between the sealing plate 2 and the negative terminal 8 with more certainty.

In consideration for connection between the flange 8c of the negative terminal 8 and a bus-bar connecting the adjoining prismatic secondary batteries to each other in the assembled battery, the height of the wall 10b is preferably less than the thickness of the flange 8c. That is, the flange 8c preferably projects from the wall 10b in the direction away from the sealing plate 2, that is, the direction perpendicular to the sealing plate 2.

The distance from an end portion (left-hand-side end portion in FIG. 2) of the sealing plate 2 in the longitudinal direction to the terminal insertion hole 21 is preferably less than $\frac{1}{3}$L, where L is the length of the sealing plate 2 in the longitudinal direction of the sealing plate 2. The distance from the end portion (left-hand-side end portion in FIG. 2) of the sealing plate 2 in the longitudinal direction to the gas exhausting valve 17 preferably ranges from $\frac{1}{3}$L to $\frac{2}{3}$L. The distance from the end portion (left-hand-side end portion in FIG. 2) of the sealing plate 2 in the longitudinal direction to a contact between the sealing plate 2 and the positive-electrode current collector 6 is preferably more than $\frac{2}{3}$L. With this structure, an assembled battery including prismatic secondary batteries the orientations of which are alternately changed can be readily manufactured.

The length of the sealing plate 2 in the transverse direction of the sealing plate 2 is 10 mm or more. When the length of the sealing plate 2 in the longitudinal direction of the sealing plate 2 is equal to or more than 5 times the length of the sealing plate 2 in the transverse direction of the sealing plate 2, the amount of water caused by condensation particularly increases. Accordingly, the present invention is particularly effective in this case.

The recessed portion 20 is preferably formed between an end portion of the sealing plate 2 and a position $\frac{1}{3}$ of the length of the sealing plate away from the end portion of the sealing plate 2 in the longitudinal direction of the sealing plate 2.

The length of the first groove 22 in the transverse direction of the sealing plate 2 is preferably less than the length of the recessed portion 20 in the transverse direction of the sealing plate 2. The length of the second groove 23 in the transverse direction of the sealing plate 2 is preferably less than the length of the recessed portion 20 in the transverse direction of the sealing plate 2. With this structure, the outer insulating member 10 can be prevented from greatly shifting in the recessed portion 20. The length of the first groove 22 in the transverse direction of the sealing plate 2 is preferably equal to or less than half of the length of the recessed portion 20 in the transverse direction of the sealing plate 2. The length of the second groove 23 in the transverse direction of the sealing plate 2 is preferably equal to or less than the half of the length of the recessed portion 20 in the transverse direction of the sealing plate 2. The length of the first groove 22 and the length of the second groove 23 in the transverse direction of the sealing plate 2 are preferably 0.5 mm or more, more preferably 1 mm or more.

The length of the first groove 22 and the length of the second groove 23 in the transverse direction of the sealing plate 2 can be changed in accordance with the position thereof in the longitudinal direction of the sealing plate 2. For example, the length of the first groove 22 in the transverse direction of the sealing plate 2 may gradually decrease as the position thereof is nearer to an end portion of the sealing plate 2 in the longitudinal direction.

The first groove 22 and the second groove 23 preferably extend to respective central portions of the recessed portion 20 in the transverse direction of the sealing plate 2. With this structure, a short circuit due to water can be more effectively prevented from occurring between the sealing plate 2 and the negative terminal 8. At least a part of the first groove 22 or the second groove 23 preferably extends to the corresponding end of the recessed portion 20 in the longitudinal direction of the sealing plate 2 at the center of the end of the recessed portion 20 in the transverse direction of the sealing plate 2.

The distance between an end of the recessed portion 20 in the longitudinal direction of the sealing plate 2 and the outer insulating member 10 is preferably longer than the distance between an end of the recessed portion 20 in the transverse direction of the sealing plate 2 and the outer insulating member 10. With this structure, the outer insulating member 10 can be prevented from greatly shifting in the recessed portion 20.

Assembled Battery

Figure 8:
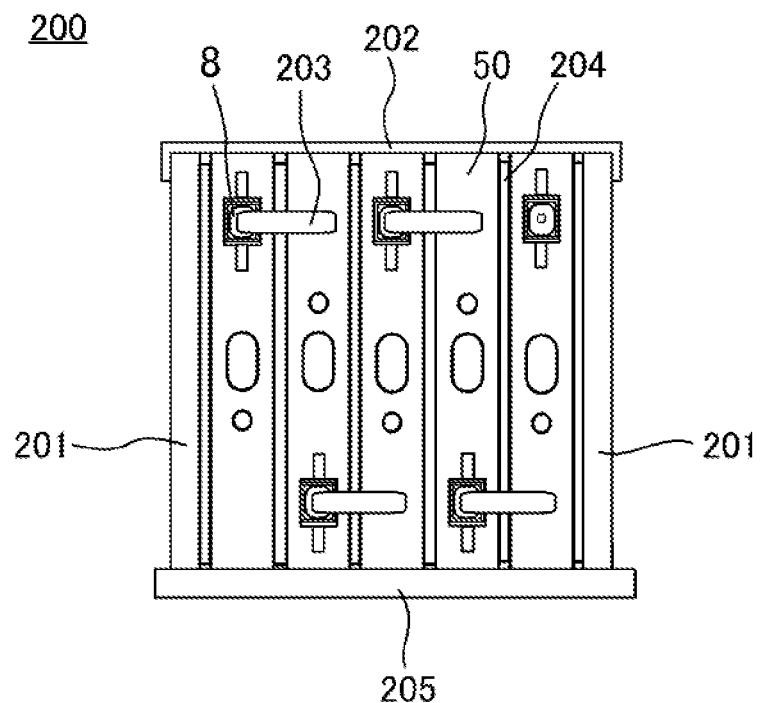
FIG. 8 illustrates an assembled battery according to the embodiment.

FIG. 8 illustrates an assembled battery 200 including the prismatic secondary batteries 50. The prismatic secondary batteries 50 are stacked between a pair of end plates 201 with resin spacers 204 interposed therebetween. The pair of the end plates 201 are connected to each other by using a bind bar 202. The stack of the prismatic secondary batteries 50 is disposed on an assembled battery base 205. The pair of the end plates 201 are connected to the assembled battery base 205. Each end plate 201 is preferably formed of a metal or a resin. The bind bar 202 is preferably formed of a metal.

The negative terminal 8 of each prismatic secondary battery 50 is electrically connected to the sealing plate 2 of another prismatic secondary battery 50 adjacent thereto by using a corresponding one of metallic bus-bars 203. Each bus-bar 203 is preferably formed of aluminum or aluminum alloy.

When each prismatic secondary battery 50 is arranged such that the sealing plate 2 extends in the vertical direction during the use of the prismatic secondary battery, a short circuit due to, for example, water caused by condensation is likely to occur between the sealing plate 2 and the negative terminal 8 as described above. Accordingly, the prismatic secondary battery 50, which is arranged such that the sealing plate 2 extends in the vertical direction during the use of the prismatic secondary battery, includes the first groove 22 and the second groove 23, which enable a short circuit to be effectively prevented from occurring between the sealing plate 2 and the negative terminal 8.

Figure 9:
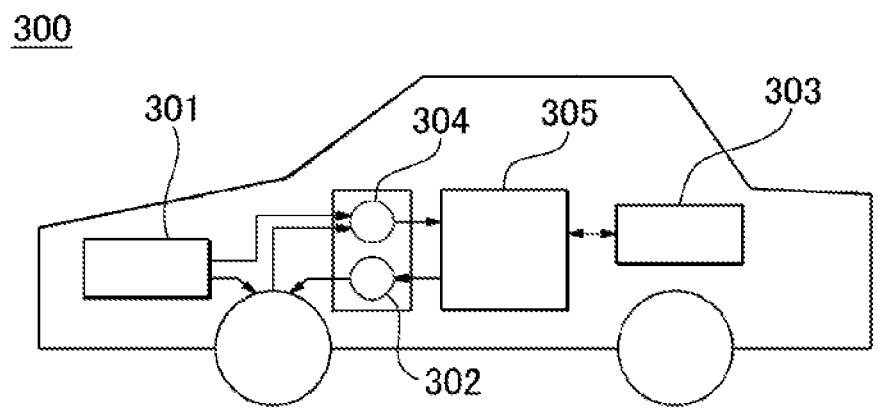
FIG. 9 illustrates a vehicle equipped with a power supply device including the assembled battery.
Figure 10A:
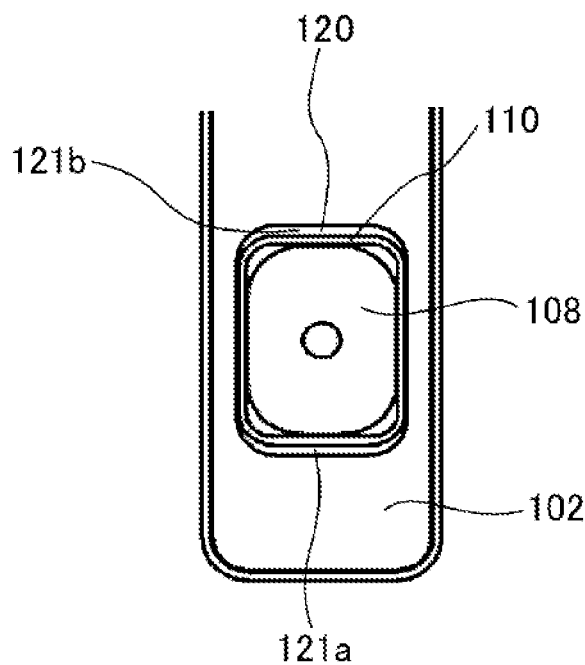
FIG. 10A illustrates a part of a prismatic secondary battery near a negative terminal.
Figure 10B:
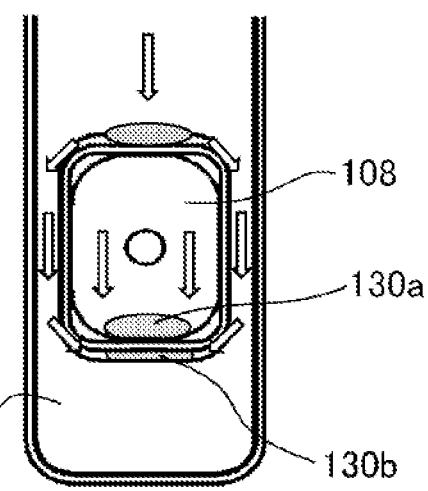
FIG. 10B illustrates a short circuit due to water caused by condensation.

FIG. 9 illustrates a vehicle 300 equipped with the assembled battery 200.

Examples of the vehicle 300 can include a hybrid electric vehicle that travels with an engine and a motor. In this case, the vehicle 300 is equipped with an engine 301, a motor 302 for travel, a generator 304, and a power supply device 303 that includes the assembled battery and that supplies power to the motor 302. The power supply device 303 is connected to the motor 302 and the generator 304 with a DC/AC inverter 305 interposed therebetween.

Others

In examples described according to the above embodiment, the sealing plate and the positive-electrode current collector are connected to each other. However, the sealing plate and the negative-electrode current collector can be connected to each other in the same manner as above. In this case, the sealing plate and the positive-electrode current collector are insulated from each other.

The electrode body is not particularly limited to the shape thereof and may be a wound electrode body or a stacked electrode body. The positive-electrode sheet, the negative-electrode sheet, the separator, and the electrolytic solution, for example, can be the same as conventional ones.

An outer circumferential groove is preferably formed on the surface of the sealing plate on the outer side of the battery near the outer circumference of the sealing plate. The outer circumferential groove formed on the sealing plate enables the weld between the sealing plate and the prismatic exterior body to be more stable. Consequently, the reliability of the prismatic secondary battery increases. The outer circumferential groove is preferably formed along the outer circumference of the sealing plate. The outer circumferential groove may be an annular groove or an annular groove a part of which is removed.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery comprising:
   an electrode body including a first electrode sheet and a second electrode sheet having a polarity opposite to a polarity of the first electrode sheet;
   a prismatic exterior body that has an opening and that accommodates the electrode body;
   a sealing plate that seals the opening; and
   a terminal electrically connected to the first electrode sheet,
   wherein the second electrode sheet is electrically connected to the sealing plate,
   wherein the sealing plate has a recessed portion formed on an outer surface and a terminal insertion hole formed in the recessed portion,
   wherein the terminal is inserted in the terminal insertion hole,
   wherein an outer insulating member is disposed between the terminal and the sealing plate, and
   wherein the sealing plate has a groove extending in a longitudinal direction of the sealing plate,
   wherein the groove joins to the recessed portion.

2. The prismatic secondary battery according to claim 1,
   wherein a gas exhausting valve is formed in the sealing plate,
   wherein a current collector electrically connected to the second electrode sheet is connected to an inner surface of the sealing plate,
   wherein a distance from an end portion of the sealing plate in the longitudinal direction to the terminal insertion hole is less than $\frac{1}{3}L$ where L is a length of the sealing plate in the longitudinal direction of the sealing plate,
   wherein a distance from the end portion of the sealing plate in the longitudinal direction to the gas exhausting valve ranges from $\frac{1}{3}L$ to $\frac{2}{3}L$, and
   wherein a distance from the end portion of the sealing plate in the longitudinal direction to a contact between the sealing plate and the current collector is more than $\frac{2}{3}L$.

3. The prismatic secondary battery according to claim 1,
   wherein a length of the sealing plate in a transverse direction of the sealing plate is 10 mm or more, and
   wherein a length of the sealing plate in the longitudinal direction of the sealing plate is equal to or more than 5 times the length of the sealing plate in the transverse direction of the sealing plate.

4. The prismatic secondary battery according to claim 1,
   wherein the recessed portion is formed between an end portion of the sealing plate and a position $\frac{1}{3}$ of a length of the sealing plate away from the end portion of the sealing plate in the longitudinal direction of the sealing plate.

5. The prismatic secondary battery according to claim 1,
   wherein a length of the groove in a transverse direction of the sealing plate is less than a length of the recessed portion in the transverse direction of the sealing plate.

6. The prismatic secondary battery according to claim 1,
   wherein a distance between the end of the recessed portion in the longitudinal direction of the sealing plate and the outer insulating member is longer than a distance between an end of the recessed portion in a transverse direction of the sealing plate and the outer insulating member.

7. An assembled battery comprising:
   a plurality of the prismatic secondary batteries according to claim 1.

8. The assembled battery according to claim 7,
   wherein the plurality of the prismatic secondary batteries are arranged such that each sealing plate extends in a vertical direction.

9. A vehicle comprising:
   the assembled battery according to claim 7.

* * * * *